United States Patent Office 3,173,939
Patented Mar. 16, 1965

3,173,939
PROCESS FOR THE PREPARATION OF CYANO-METHYLENEGLUTARIC AND CYANOMETHYL-GLUTARIC COMPOUNDS
Francis Johnson, Newton Lower Falls, Mass., assignor to The Dow Chemical Company, Midland, Mich., a corporation of Delaware
No Drawing. Filed Nov. 1, 1961, Ser. No. 149,200
9 Claims. (Cl. 260—465.4)

This invention relates to a process for the preparation of 3-cyanomethylglutaconates and 3-cyanomethylglutarates and to novel compounds produced by the process.

It is an object of this invention to provide a process for preparing 3-cyanomethyleneglutarate compounds. It is also an object of this invention to provide novel 3-cyanomethyleneglutarate compounds. The invention also contemplates a process for preparing 3-cyanomethylglutarate compounds from 3-cyanomethyleneglutarate compounds. It is still another object of this invention to provide novel 3-cyanomethylglutarate compounds.

I discovered that acetonedicarboxylates can be reacted with a cyanoacetic acid to produce 3-cyanomethyleneglutarate. The 3-cyanomethyleneglutarates are hydrogenated to the corresponding 3-cyanomethylglutarates. The reactions are broadly illustrated as follows:

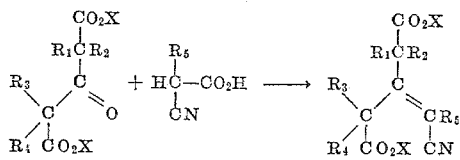

The acetonedicarboxylates useful in my process are those depicted by the structural formula in the equation. The simplest hydrocarbon ester conforming to the formula is dimethyl 3-cyanomethyleneglutarate. X represents hydrogen, or a salt or ester forming group. For reasons of availability and maximum compatibility with other components of the reaction mix, X is preferably a relatively simple hydrocarbon group, such as lower alkyls, e.g., methyl, butyl or octyl. Substituted 3-cyanomethyleneglutarates are obtained when one or more of the R groups, which may be hydrogen, is any substituting group or radical that does not react with the reactants or any other component of the reaction mixture during the course of the reaction. The R groups are preferably hydrogen, lower alkyl or lower alkoxy. They may, however, include such groups as benzyl, phenyl, phenoxyl, etc. It is preferred that the carbon atoms should be bonded to at least one hydrogen atom. The simplest useful cyanoacetic acid which is preferred for this reason, is the simple unsubstituted acid.

The reaction of the acetonedicarboxylate and the cyanoacetic acid is preferably carried out in an acid containing hydrocarbon solvent and preferably a solvent containing ammonium acetate and acetic acid. Any solvent that is compatible in the system and which forms an azeotropic mixture with water may be used. These include benzene, carbon tetrachloride, methane trichloride, etc. The reaction, preferably between stoichiometric amounts of the reactants, is carried out at a temperature between ambient temperatures and reflux temperature for the system, generally between 0 and 200° C. It is preferably carried out in reflux system which results in the azeotropic removal of water. Neither time of reaction nor pressure are critical.

The 3-cyanomethyleneglutarates are converted into the corresponding 3-cyanomethylglutarates in the presence of a hydrogenation catalyst which is specific for reduction of the double bond. Such catalysts include platinum, palladium, rhodium, Raney nickel, etc. The hydrogenation conditions are not critical and are those conventional for specific reduction of the double bond.

To give those skilled in the art a better understanding of the invention, the following illustrative examples are given:

Example 1

Dimethyl acetonedicarboxylate (58 g. freshly redistilled), cyanoacetic acid (43 g.), ammonium acetate (6 g.) acetic acid (20 ml.) and benzene (150 ml.), were refluxed for 36 hours in an apparatus equipped with a water separator. During this period 10 ml. of water was removed azeotropically and collected in the trap. Further refluxing did not cause the separation of additional water. The liquid was then evaporated under reduced pressure to remove benzene and the residual slurry poured into water (300 ml.) and methylene chloride (200 ml.). The mixture was shaken, the organic layer separated, washed with water then with sodium hydrogen carbonate solution (150 ml.: 5%) and finally dried over anhydrous sodium sulfate. Removal of the organic solvent under reduced pressure yielded a pale-yellow oil (62 g.) which was distilled under reduced pressure. The first fraction distilled from 80 to 124° C. at 0.2 mm. Hg and weighed 13.7 g. It consisted largely of dimethyl acetonedicarboxylate, together with some methyl cyanoacetate. The second fraction boiled at 124–127° at 0.24 mm. Hg and weighed 42 grams. This consisted of almost pure dimethyl 3-cyanomethyleneglutarate and had $n_D^{25°}$ 1.4693. A redistilled sample had $n_D^{25°}$ 1.4696. (Found: C, 55.0%; H, 5.6%; N, 7.0%. Required for $C_9H_{11}NO_4$: C, 54.82%; H, 5.62%; N, 7.10.)

Example 2

Following the procedure of Example 1, dibutyl acetonedicarboxylate is used in place of the dimethyl acetonedicarboxylate, to prepare dibutyl 3-cyanomethyleneglutarate.

Example 3

Following the procedure of Example 1, diethyl acetonedicarboxylate is used in place of the dimethyl acetonedicarboxylate, and α-methylcyanoacetic acid is used in place of the cyanoacetic acid.

Example 4

Following the procedure of Example 1, dimethyl 2,4-dimethyl-3-oxoglutarate is used in place of the dimethyl acetonedicarboxylate.

Example 5

Dimethyl 3-cyanomethyleneglutarate (4.95 g.) was dissolved in ethanol (20 ml.) and palladium on charcoal catalyst 100 mg.; 10% Pd) was added and the heterogeneous mixture stirred with hydrogen for 2½ hours. During this period hydrogen (1.03 equiv.) was absorbed. The reduction was carried out at room temperature and pressure. Removal of the catalyst by filtration followed by evaporative removal of the ethanol, gave a pale-yellow oil (4.9 g.). In all, 38 grams of the starting nitrile-ester was hydrogenated in this way. The products of these reductions were combined and distilled twice to give dimethyl 3-cyanomethylglutarate (30 g.) of boiling point 133° at 0.42 mm. Hg $n_D^{25°}$ 1.4460. (Found: C, 54.4%; H, 6.7%; N, 7.0%. Required for $C_9H_{13}NO_4$: C, 54.26%; H, 6.58%; N, 7.03%.)

Example 6

Following the procedure of Example 5, the product of Example 2 is hydrogenated to dibutyl 3-cyanomethylglutarate.

Example 7

Following the procedure of Example 5, the product of

Example 3 is hydrogenated to diethyl 3-(1-cyanoethyl) glutarate.

Example 8

Following the procedure of Example 5, the product of Example 4 is hydrogenated to dimethyl-2,4-dimethyl-3-cyanomethylglutarate.

Similarly, other 3-cyanomethyleneglutarates are prepared from starting materials corresponding to the general definition where substituent R groups are varied. The substituent and side-chains do not alter the conditions of the reaction. When utilizing substituted starting materials it is possible to prepare novel 3-cyanomethyleneglutarate, and by subsequent hydrogenation, novel 3-cyanomethylglutarates.

The 3-cyanomethylglutaconates may have a variety of uses, primarily dependent on their activity against certain organisms. The immediate usefulness of these compounds is as intermediates in the preparation of 3-cyanomethylglutarates, which in turn are intermediates in the preparation of 3-carboxy-methylglutarimide. This latter compound and its homologues and analogues are biologically active. They are most important as intermediates in the preparation of cycloheximides, actiphenol, etc.

Although the invention has been illustrated by specific examples, it is to be understood that the invention includes all modifications and variations that come within the scope of the appended claims.

What is claimed is:
1. A process for preparing 3-cyanomethylglutaric compounds of the formula

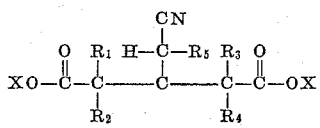

wherein X is selected from the group consisting of hydrogen and lower alkyl, and $R_1$, $R_2$, $R_3$, $R_4$, and $R_5$ are each selected from the group consisting of hydrogen and lower alkyl, comprising reacting an $\alpha,\alpha'$-diacetonedicarboxylate having the formula

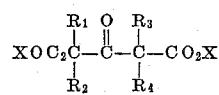

with a cyanoacetic acid having the formula

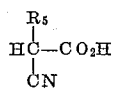

wherein X and $R_1$, $R_2$, $R_3$, $R_4$ and $R_5$ are as defined hereinabove; in an acid-containing hydrocarbon solvent to produce the reaction product, and then hydrogenating said reaction product to form the 3-cyanomethylglutarate.

2. The process of claim 1 wherein the solvent contains ammonium acetate and acetic acid.

3. The process of claim 2 wherein the R groups are hydrogen.

4. The process of claim 3 wherein the hydrogenation is carried out with hydrogen in the presence of a metal hydrogenation catalyst.

5. The process of claim 4 wherein the catalyst is selected from the group consisting of platinum, palladium, rhodium and Raney nickel.

6. The process of claim 4 wherein the reaction of said carboxylate and said cyanoacetic acid is carried out at reflux.

7. The process for preparing dimethyl 3-cyanomethylglutarate comprising heating dimethyl-$\alpha$, $\alpha'$-acetonedicarboxylate with cyanoacetic acid in benzene containing acetic acid and ammonium acetate under reflux conditions to form the reaction product, and then hydrogenating said reaction product to dimethyl 3-cyanomethylglutarate.

8. The process of claim 7 wherein the hydrogenation is carried out with hydrogen in the presence of a metal hydrogen catalyst.

9. The process of claim 8 wherein the catalyst is selected from the group consisting of platinum, palladium, rhodium and Raney nickel.

References Cited in the file of this patent

UNITED STATES PATENTS 2,655,526 Cope _____ Oct. 13, 1953
2,793,233 Stork _____ May 21, 1957

OTHER REFERENCES

Evstigneeva et al.: Chemical Abstracts, volume 45 (1951).
Takahashi et al.: Chemical Abstracts, vol. 53 (1959).
Evstigneeva et al.: Chemical Abstracts, vol. 54 (1960) page 24731.
Shemyakin et al.: Chemical Abstracts, 34 (1940), p. 3676.
Trakhtenberg et al.: Chemical Abstracts, 38 (1944), p. 3248.
Shemyakin et al.: Chemical Abstracts, 39 (1945), p. 497.

UNITED STATES PATENT OFFICE
CERTIFICATE OF CORRECTION

Patent No. 3,173,939                           March 16, 1965

Francis Johnson

It is hereby certified that error appears in the above numbered patent requiring correction and that the said Letters Patent should read as corrected below.

Column 4, line 41, after "(1951)" insert -- pages 7577-7578 --; line 42, after "(1959)" insert -- pages 21940-21941 --.

Signed and sealed this 21st day of December 1965.

(SEAL)
Attest:

ERNEST W. SWIDER                         EDWARD J. BRENNER
Attesting Officer                           Commissioner of Patents